(12) United States Patent
Smith et al.

(10) Patent No.: US 8,031,190 B2
(45) Date of Patent: Oct. 4, 2011

(54) TRANSLATING TWO-DIMENSIONAL USER INPUT ON THREE-DIMENSIONAL SCENE

(75) Inventors: Adam M. Smith, Kirkland, WA (US); Daniel R. Lehenbauer, Redmond, WA (US); Greg D. Schechter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 10/838,931

(22) Filed: May 3, 2004

(65) Prior Publication Data

US 2005/0243084 A1    Nov. 3, 2005

(51) Int. Cl.
*G06T 15/00* (2011.01)
(52) U.S. Cl. ...................... 345/419; 345/418
(58) Field of Classification Search .................. None
See application file for complete search history.

(56) References Cited

U.S. PATENT DOCUMENTS

| | | | |
|---|---|---|---|
| 5,561,752 A | 10/1996 | Jevans | 345/522 |
| 6,215,495 B1 | 4/2001 | Grantham et al. | 345/419 |
| 6,230,116 B1 | 5/2001 | Ronen et al. | 703/22 |
| 6,243,856 B1 | 6/2001 | Meyer et al. | 717/146 |
| 6,445,740 B1 | 9/2002 | Mallart et al. | |
| 6,518,965 B2 | 2/2003 | Dye et al. | 345/419 |
| 6,570,564 B1 | 5/2003 | Sowizral et al. | 345/420 |
| 6,912,293 B1 | 6/2005 | Korobkin | |

(Continued)

FOREIGN PATENT DOCUMENTS

JP     2001-502907     2/2001

(Continued)

OTHER PUBLICATIONS

Sowizral, H., Rushforth, K., Deering, M., The Java 3D API Specification, Apr. 2000, Sun Microsystems, Version 1.2, Chapters 1-3, 5, 8, 9, 11, 14 and Appendix C.*

(Continued)

*Primary Examiner* — Said Broome
(74) *Attorney, Agent, or Firm* — Merchant & Gould P.C.

(57) ABSTRACT

A computing system translates two-dimensional (2D) graphical input by a user who is selecting one or more 2D images in a three-dimensional (3D) scene of 3D models created by model 3D objects. The computing system comprises a viewport module, a retrieve module, set ray module and, a hit detection module. The viewport module defines 2D boundaries of the 3D scene and a view point location in 3D space for viewing the 3D scene. The retrieve module retrievies a selection point location in 2D space for the 2D graphical input. The set ray module sets a pick ray in 3D space based on the view point location and the selection point location. The hit detection module detects a hit by the pick ray on a 3D model in the 3D scene. In this computing system there is a method of processing a hierarchy of computer program visual objects for detecting a hit by 2D input on 2D and 3D images displayed by a computing system. The method begins by traversing branches of a first tree hierarchy of visual objects to leaf objects. Next the method detects whether the next unprocessed leaf object is a visual 2D object with 2D geometry or a model 3D object with 3D geometry. Lastly the method calls a 2D process to detect a hit on the 2D geometry of a visual object if a visual 2D object is detected and calls the 3D process to detect a hit on the 3D geometry of a visual object if a model 3D object is detected.

14 Claims, 9 Drawing Sheets

U.S. PATENT DOCUMENTS

| | | | |
|---|---|---|---|
| 7,145,562 | B2 | 12/2006 | Schechter et al. ............ 345/420 |
| 2001/0016806 | A1 | 8/2001 | Ronen ............................. 703/20 |
| 2005/0039176 | A1 | 2/2005 | Fournie ......................... 717/156 |
| 2005/0140694 | A1* | 6/2005 | Subramanian et al. ....... 345/619 |
| 2005/0140964 | A1 | 6/2005 | Eschenauer et al. ............ 356/10 |

FOREIGN PATENT DOCUMENTS

| | | |
|---|---|---|
| JP | 2001-273520 | 10/2001 |
| JP | 2001-312741 | 11/2001 |
| WO | WO 98/24061 | 6/1998 |
| WO | WO01 01075 | 1/2001 |

OTHER PUBLICATIONS

Sowizral, H., Rushforth, K., Deering, M., The Java 3D API Specification, Apr. 2000, Sun Microsystems, Version 1.2, Appendix G, pp. 1-30.*

International Search Report for PCT/US04/24369.

Bresler et al., "A Hierarchical Bayesian Approach to Reconstruction from Projections of a Multiple Object 3-D Scene," Seventh International Conference on Pattern Recognition, Jul. 30-Aug. 2, 1984, pp. 455-457.

Dollner, et al., "Object-oriented 3D Modelling, Animation and Interaction," The Journal of Visualization and Computer Animation, vol. 8: 33-64 (1997).

Dong et al., "An Algorithm for 3D Scene Description in an Unknown Environment," Proceedings of the IEEE Southwest Symposium on Image Analysis and Interpretation, Apr. 21-24, 1994, pp. 136-141.

Garcia et al., "Efficient Generation of Object Hierarchies from 3D Scenes," Proceedings of the 1999 IEEE International Conference on Robotics & Automation, Detroit, MI, May 1999, pp. 1359-1364.

Porras et al., "Embodied Modelling Tools in a 3D Environment," The 8$^{th}$ International Conference in Central Europe on Computer Graphics, Visualization and Interactive Digital Media'2000, Feb. 7-10, 2000, pp. 92-99.

Romanovsky, A.V., "Use of Data Types for Visual Modeling Dynamics of Three-Dimensional Scenes," translated in: Optoelectronics, Instrumentation and Data Processing No. 2, pp. 37-46, 1994.

Zhang et al., "On 3D Scene Flow and Structure Estimation," Proceedings of the 2001 IEEE Computer Society Conference on Computer Vision and Pattern Recognition, Dec. 8-14, 2001, pp. II-778 through II-785.

Japanese Patent Office Notice of Rejection dated Apr. 19, 2010, cited in Japanese Patent Application No. 2007-511344 (Rejection in Japanese, summarized translation provided); 5 pages.

Japanese Patent Office Final Notice of Rejection dated Aug. 10, 2010, cited in Japanese Patent Application No. 2007-511344 (Rejection in Japanese, summarized translation provided); 4 pages.

Japanese Patent Office Final Rejection and Decision of Dismissal of Amendment dated Dec. 3, 2010, cited in Japanese Patent Application No. 2007-511344 (Rejection in Japanese, summarized translation provided); 4 pages.

Chinese Patent Office First Office Action dated Aug. 1, 2008, cited in Chinese Patent Application No. 200480042906.4 (in Chinese with English translation attached); 11 pages.

Chinese Patent Office Second Office Action dated Mar. 20, 2009, cited in Chinese Patent Application No. 200480042906.4, (in Chinese with English translation attached); 8 pages.

Chinese Patent Office Decision on Rejection dated Jan. 8, 2010, cited in Chinese Patent Application No. 200480042906.4, (in Chinese with English translation attached); 10 pages.

Korean Patent Office Action dated Jan. 19, 2011, cited in Korean Patent Application No. 10-2006-7021882 (in Korean, no English translation available); 4 pages.

Australian Patent Examiner's First Report cited in Australian Patent Application No. 2004319589 dated Oct. 19, 2009; 2 pages.

Response to Australian Patent Examiner's First Report dated Feb. 1, 2010 cited in Australian Patent Application No. 2004319589; 31 pages.

Australian Patent Examiner's Second Report cited in Australian Patent Application No, 2004319589 dated Mar. 3, 2010; 3 pages.

Response to Australian Patent Examiner's Second Report dated May 31, 2010 cited in Australian Patent Application No. 2004319589; 15 pages.

Australian Patent Examiner's Third Report cited in Australian Patent Application No. 2004319589 dated Jun. 15, 2010; 2 pages.

Response to Australian Patent Examiner's Third Report dated Jul. 22, 2010 cited in Australian Patent Application No. 2004319589; 15 pages.

Russian Patent Office Official Action dated Jul. 4, 2008, cited in Russian Patent Application No. 2006142687/09/(046602); 5 pages.

Russian Patent Office Decision on Grant dated Dec. 5, 2008, cited in Russian Patent Application No. 2006142687/09(046602) (in Russian with English translation attached); 15 pages.

USPTO Non-Final Office Action mailed Nov. 1, 2005, cited in U.S. Appl. No. 10/838,936; 17 pages.

Amendment and Response to Non-Final Office Action filed Apr. 3, 2006, cited in U.S. Appl. No. 10/838,936; 18 pages.

USPTO Final Office Action mailed Jul. 5, 2006, cited in U.S. Appl. No, 10/838,936; 15 pages.

USPTO Notice of Abandonment mailed Apr. 4, 2007, cited in U.S. Appl. No. 10/838,936; 2 pages.

USPTO Non-Final Office Action mailed Jul. 28, 2005, cited in U.S. Appl. No. 10/838,935; 9 pages.

Amendment and Response to Non-Final Office Action filed Jan. 30, 2006, cited in U.S. Appl. No. 10/838,935; 14 pages.

USPTO Non-Final Office Action mailed Apr. 20, 2006, cited in U.S. Appl. No. 10/838,935; 7 pages.

Amendment and Response to Non-Final Office Action filed Jun. 23, 2006, cited in U.S. Appl. No. 10/838,935; 7 pages.

USPTO Notice of Allowance mailed Sep. 13, 2006, cited in U.S. Appl. No. 10/838,935; 6 pages.

International Search Report for PCT/US04/24368.

* cited by examiner

TRANSLATING TWO-DIMENSIONAL USER INPUT ON THREE-DIMENSIONAL SCENE

CROSS REFERENCE TO RELATED APPLICATION

The present application is related to U.S. patent application Ser. No. 10/838,935, entitled INTEGRATION OF THREE DIMENSIONAL SCENE HIERARCHY INTO TWO DIMENSIONAL COMPOSITING SYSTEM, filed May 3, 2004, which has now issued as U.S. Pat. No. 7,145,562, and U.S. patent application Ser. No. 10/838,936 entitled MODEL 3D CONSTRUCTION APPLICATION PROGRAM INTERFACE, filed May 3, 2004, both applications assigned to the Assignee of the present invention and hereby incorporated by reference in their entirety.

TECHNICAL FIELD

The invention relates generally to the field of computer graphics. More particularly, the invention relates to translating user input through two-dimensional elements into a three-dimensional scene in a two-dimensional compositing system.

BACKGROUND OF THE INVENTION

The limits of the traditional model of accessing graphics on computer systems are being reached, in part because memory and bus speeds have not kept up with the advancements in main processors and/or graphics processors. In general, the current model for preparing a frame using bitmaps requires too much data processing to keep up with the hardware refresh rate when complex graphics effects are desired. As a result, when complex graphics effects are attempted with conventional graphics models, instead of completing the changes that result in the perceived visual effects in time for the next frame, the changes may be added over different frames, causing results that are visually undesirable.

Further, this problem is aggravated by the introduction of three-dimensional (3D) graphics into the two-dimensional (2D) compositing system to display a mixed scene with 2D images and 3D scenes. One of the problems with such a mixed system is how to translate a user's 2D mechanical input with a mouse, pen or other pointing device into a computer input when the user is pointing at a 2D view of a 3D scene on a computer display screen. What is needed is a graphics generation and compositing system that can translate the user input into computer input for 3D scenes as well as the standard 2D images.

It is with respect to these considerations and others that the present invention has been made.

SUMMARY OF THE INVENTION

The above and other problems are solved by a computing system for translating two-dimensional (2D) graphical input by a user who is selecting one or more 2D images in a three-dimensional (3D) scene of 3D models created by model 3D objects. The computing system comprises a viewport module, a retrieve module, a set ray module and, a hit detection module. The viewport module defines 2D boundaries of the 3D scene and a view point location in 3D space for viewing the 3D scene. The retrieve module retrievies a selection point location in 2D space for the 2D graphical input. The set ray module sets a pick ray in 3D space based on the view point location and the selection point location. The hit detection module detects a hit by the pick ray on a 3D model in the 3D scene.

In accordance with still other aspects, the present invention relates to a method of processing a hierarchy of computer program visual objects for detecting a hit by 2D input on two dimensional (2D) and three-dimensional (3D) images displayed by a computing system. The method traverses branches of a first tree hierarchy of visual 2D and 3D objects. Next the method detects whether the next unprocessed object is a visual 2D object with 2D geometry or a model 3D object with 3D geometry. Lastly the method calls a 2D process to detect a hit on the 2D geometry of a visual object if a visual 2D object is detected and calls the 3D process to detect a hit on the 3D geometry of an object if a model 3D object is detected.

In a further aspect of the method, the 3D process comprises setting a camera view point, and converting the 2D input into a ray based on the camera view point, the ray penetrating the 3D space of the images of one or more 3D models defined by the model 3D objects.

The invention may be implemented as a computer process, a computing system or as an article of manufacture such as a computer program product or computer readable media. The computer readable media may be a computer storage media readable by a computer system and encoding a computer program of instructions for executing a computer process. The computer readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
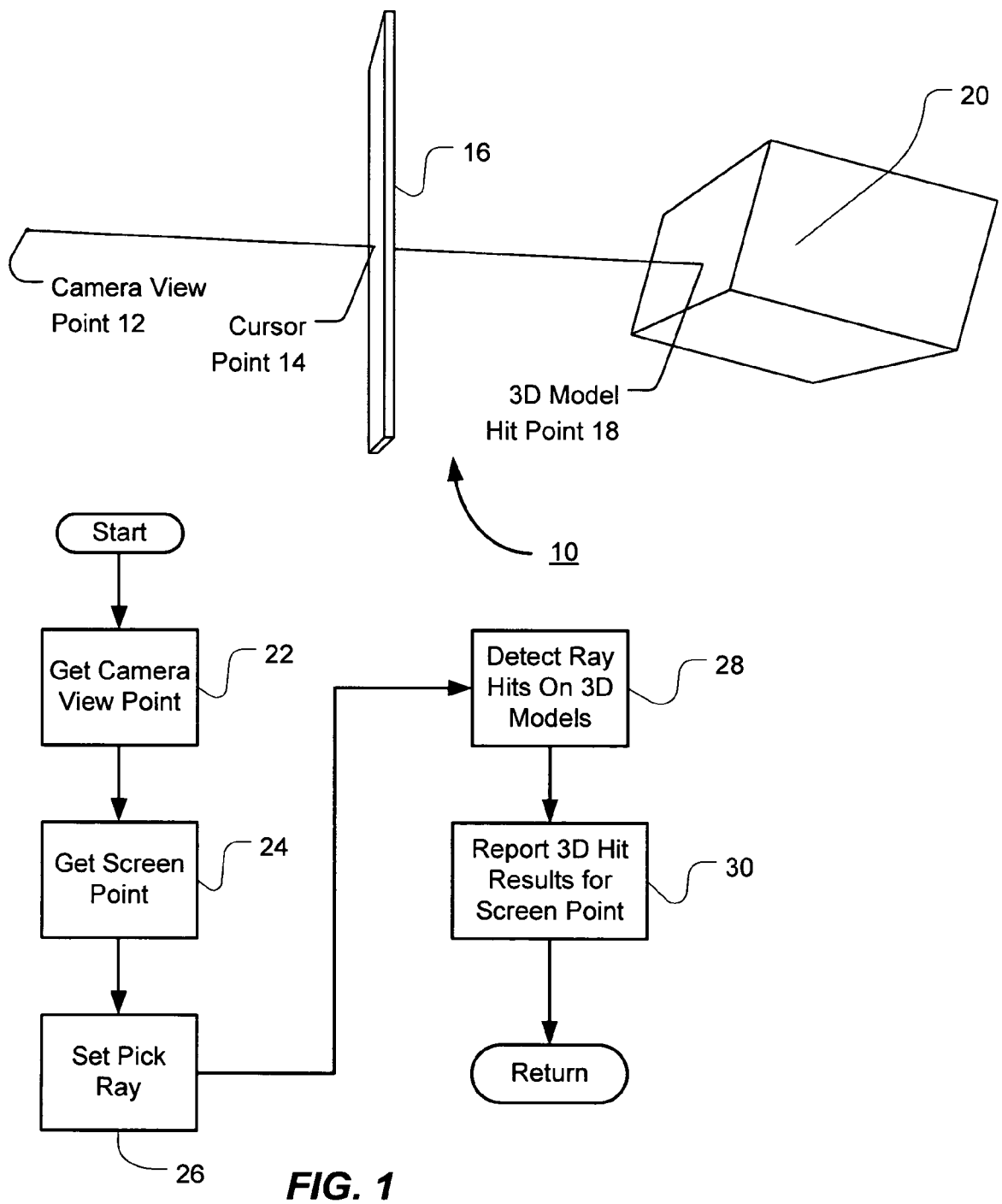
FIG. 1 illustrates a system for translating user input into 3D scenes in a 2D compositing system according to one embodiment of the present invention.

FIG. 1 illustrates the basic geometry and logical operations of translating a 3D model hit point to computer using a "pick ray" defined by a camera view point in 3D space and a cursor point on the display screen. The geometry 10 of the translation includes the camera view point 12, the cursor point 14 on the display screen 16 and the hit point 16 on the 3D model 20. The camera view point 16 is defined by the virtual camera X, Y, Z three-dimensional (3D) location. The cursor point 14 has an X, Y, Z (3D) location on the display screen 16. The X, Y location of the cursor point defines the location of the cursor on the display screen for purposes of translating 2D input from the pointing device controlling the cursor. The location of the camera view point 12 and the cursor point 14 define the direction of the pick ray 15.

When 2D hit detection operation is called and there is a 2D view of a 3D scene, the operation flow enters the basic hit detection routine in FIG. 1 and begins at get camera view operation 22. This operation retrieves the 3D location of the camera view point or eye point 12. Generally, the camera view point 12 is aligned with the center of the display screen 16 although it could be placed in other alignments with the display screen. Get cursor point operation 24 retrieves the 3D location of the cursor point 14 on the display screen 16. Set pick ray operation 26 sets the path of a ray 15 from the camera view point 12 through the cursor point 16 and into 3D scene space based on the 3D locations of these two points. The pick ray 15 proceeds into 3D space to intersect 3D model 20 at hit or intersection point 18. The intersection point location will be an X, Y, Z location along the pick ray.

Ray hit detect operation 28 will detect the intersection point 18 on the model based on the ray information and the 3D geometry of the 3D model 20. There may be multiple intersections as the pick ray 15 passes through the 3D model. In FIG. 1 there will be a second intersection point (not shown) as the pick ray exits the cube 20.

Report operation 30 reports the results of the hit detection. The results will be 3D results and include a display of the model intersected by the ray (a reference to the 3D model object is reported from which the display is rendered), the intersection location of the hit by the ray, multiple hits and intersection location of each hit, and further any model 3D program objects traversed in the 3D scene tree in performing the hit detection. This latter information is referred to as the hit path or pick path. Lastly, the hit detection is converted to 2D information. The 2D information of the hit is known because the cursor point location is known. To this cursor point location is added the above 3D hit information.

The hit detection operational flow is described more completely hereinafter in reference to FIGS. 6, 7 and 8. An exemplary operative hardware and software environment for implementing the invention will now be described.

Exemplary Operating Environment

Figure 2:
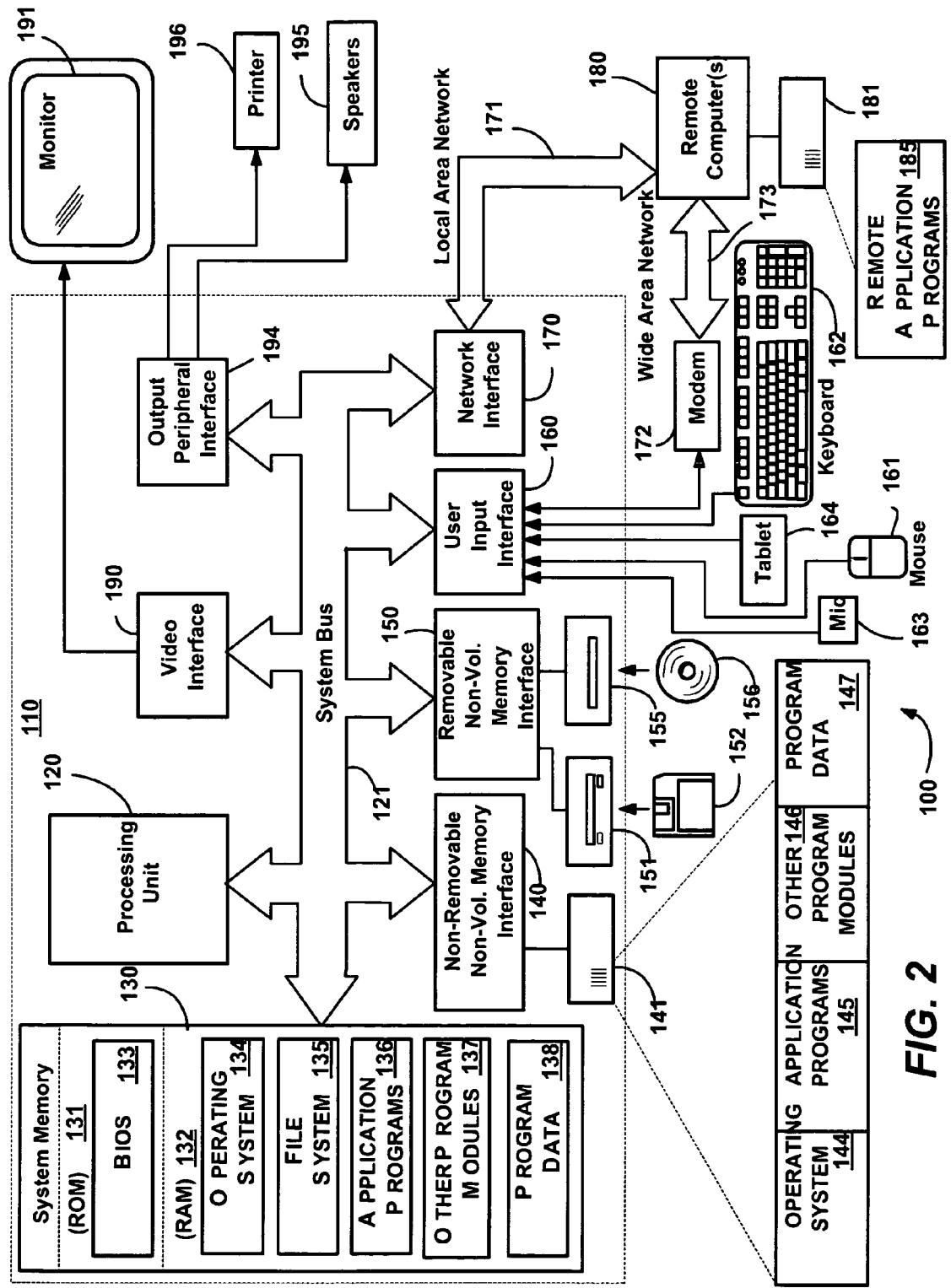
FIG. 2 illustrates an example of a suitable computing system environment on which embodiments of the invention may be implemented.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like. The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136 and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 2, provide storage of computer-readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Software Environment for Processing the Visual Tree Hierarchy

Figure 3:
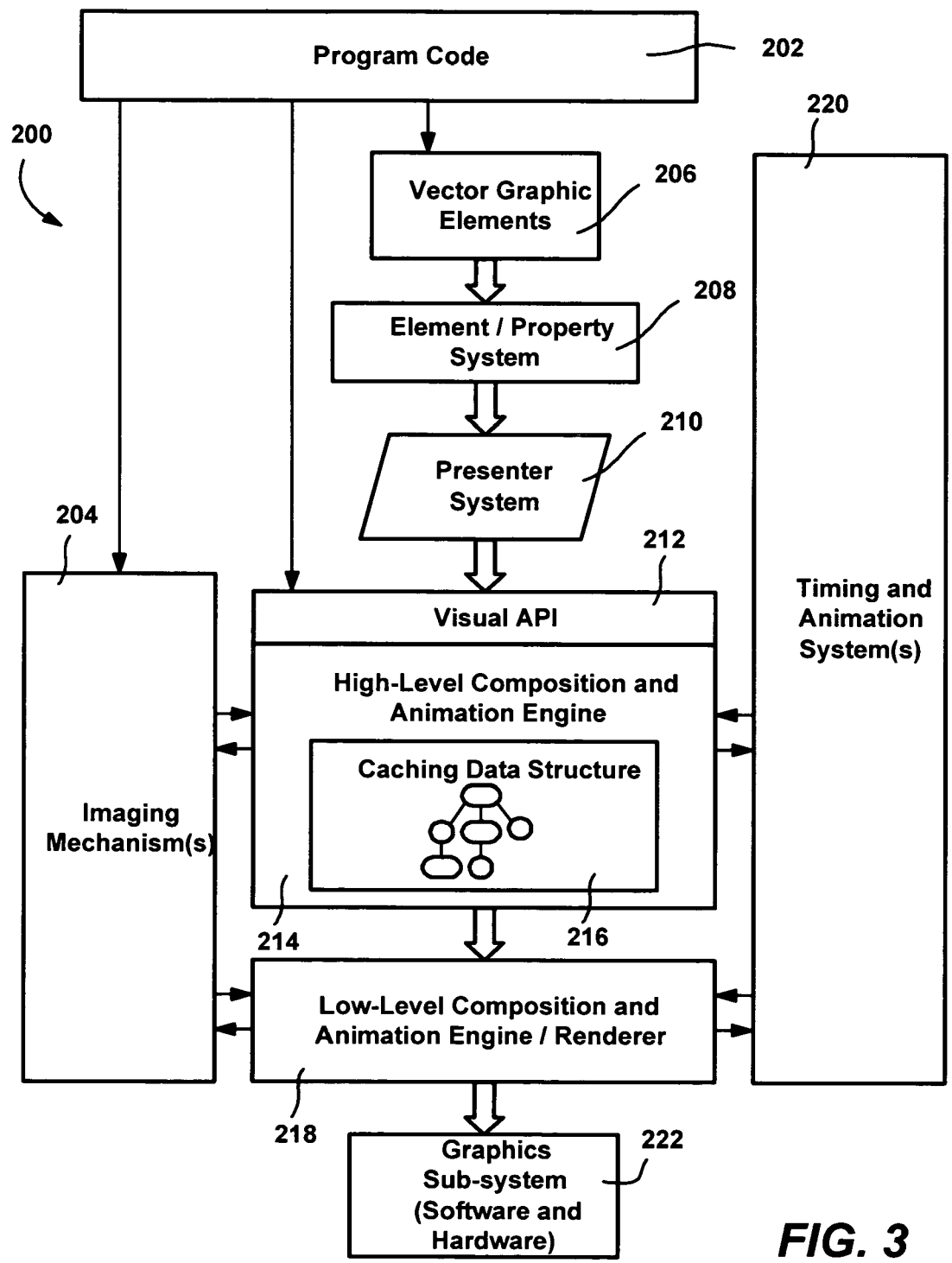
FIG. 3 is a block diagram generally representing a graphics layer architecture into which the present invention may be incorporated.

FIG. 3 represents a general, layered architecture 200 in which visual trees may be processed. As represented in FIG. 3, program code 202 (e.g., an application program or operating system component or the like) may be developed to output graphics data in one or more various ways, including via imaging 204, via vector graphic elements 206, and/or via function/method calls placed directly to a visual application programming interface (API) layer 212, in accordance with an aspect of the present invention. In general, imaging 204 provides the program code 202 with a mechanism for loading, editing and saving images, e.g., bitmaps. As described below, these images may be used by other parts of the system, and there is also a way to use the primitive drawing code to draw to an image directly. Vector graphics elements 206 provide another way to draw graphics, consistent with the rest of the object model (described below). Vector graphic elements 206 may be created via a markup language, which an element/property system 208 and presenter system 210 interprets to make appropriate calls to the visual API layer 212.

The graphics layer architecture 200 includes a high-level composition and animation engine 214, which includes or is otherwise associated with a caching data structure 216. The caching data structure 216 contains a scene graph comprising hierarchically-arranged objects that are managed according to a defined object model, as described below. In general, the visual API layer 212 provides the program code 202 (and the presenter system 210) with an interface to the caching data structure 216, including the ability to create objects, open and close objects to provide data to them, and so forth. In other words, the high-level composition and animation engine 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

The high-level composition and animation engine 214 passes an instruction stream and possibly other data (e.g., pointers to bitmaps) to a fast, low-level compositing and animation engine 218. As used herein, the terms "high-level" and "low-level" are similar to those used in other computing scenarios, wherein in general, the lower a software component is relative to higher components, the closer that component is to the hardware. Thus, for example, graphics information sent from the high-level composition and animation engine 214 may be received at the low-level compositing and animation engine 218, where the information is used to send graphics data to the graphics subsystem including the hardware 222.

The high-level composition and animation engine 214 in conjunction with the program code 202 builds a scene graph to represent a graphics scene provided by the program code 202. For example, each item to be drawn may be loaded with drawing instructions, which the system can cache in the scene graph data structure 216. As will be described below, there are a number of various ways to specify this data structure 216, and what is drawn. Further, the high-level composition and animation engine 214 integrates with timing and animation systems 220 to provide declarative (or other) animation control (e.g., animation intervals) and timing control. Note that the animation system allows animate values to be passed essentially anywhere in the system, including, for example, at the element property level 208, inside of the visual API layer 212, and in any of the other resources. The timing system is exposed at the element and visual levels.

The low-level compositing and animation engine 218 manages the composing, animating and rendering of the scene, which is then provided to the graphics subsystem 222. The low-level engine 218 composes the renderings for the scenes of multiple applications, and with rendering components, implements the actual rendering of graphics to the screen. Note, however, that at times it may be necessary and/or advantageous for some of the rendering to happen at higher levels. For example, while the lower layers service requests from multiple applications, the higher layers are instantiated on a per-application basis, whereby is possible via the imaging mechanisms 204 to perform time-consuming or application-specific rendering at higher levels, and pass references to a bitmap to the lower layers.

Figure 4:
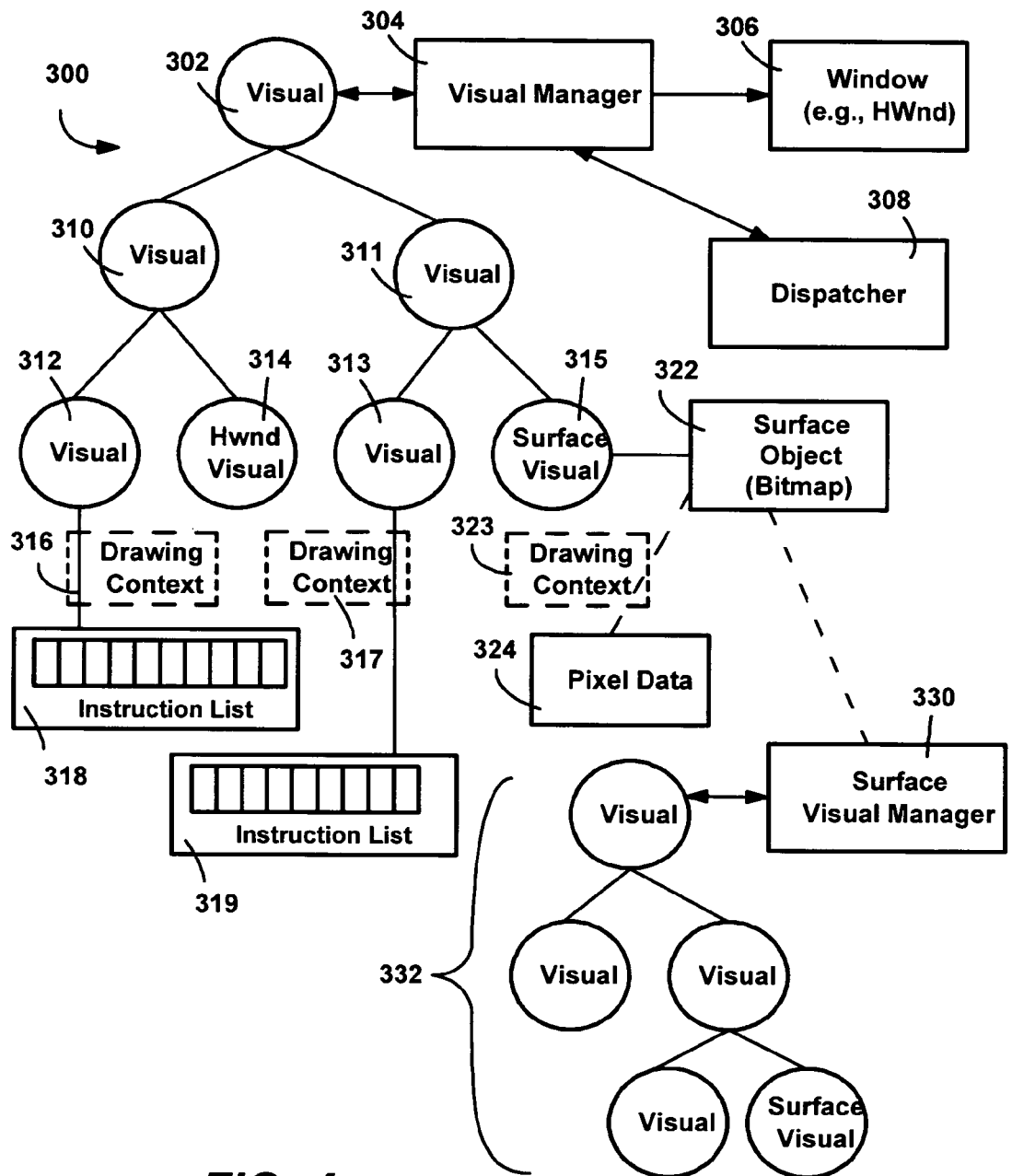
FIG. 4 is a representation of a scene graph of visuals and associated components for processing the scene graph such as by traversing the scene graph to provide graphics commands and other data.
Figure 5:
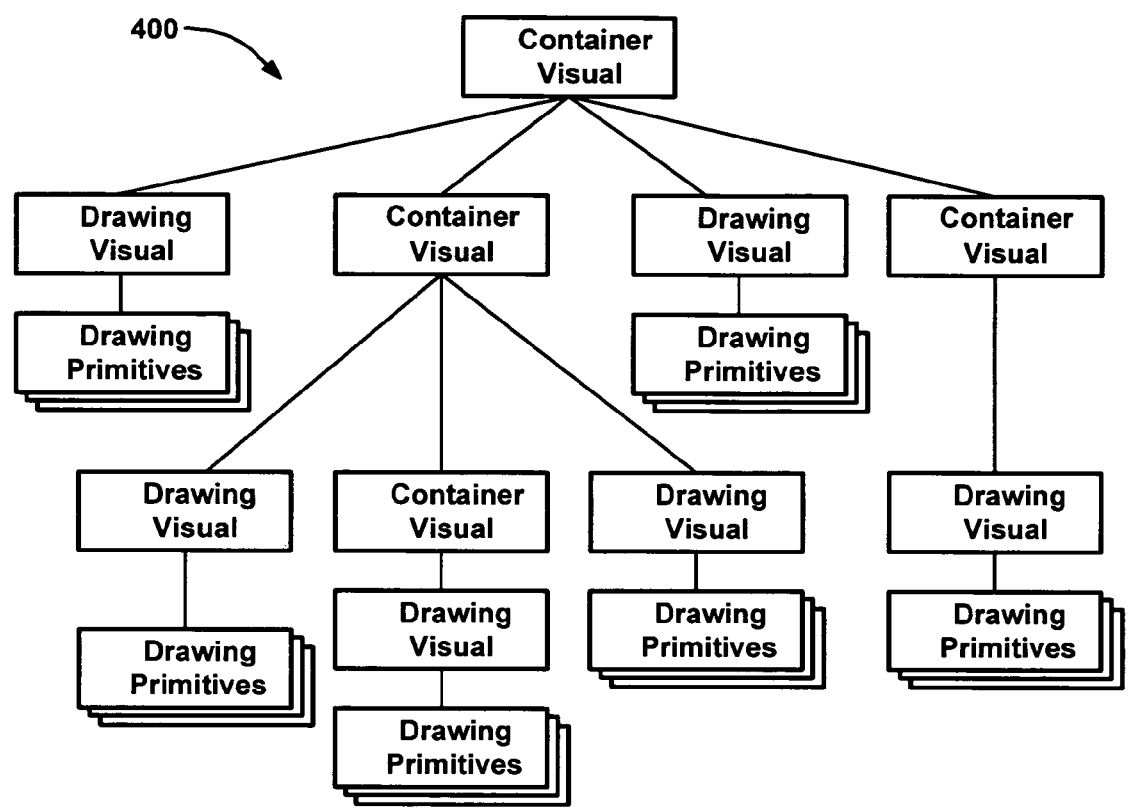
FIG. 5 is a representation of a scene graph of validation visuals, drawing visuals and associated drawing primitives constructed.

FIGS. 4 and 5 show example scene graphs 300 and 400, respectively, including a base object referred to as a visual. In general, a visual comprises an object that represents a virtual surface to the user and has a visual representation on the display. As represented in FIG. 4, a top-level (or root) visual 302 is connected to a visual manager object 304, which also has a relationship (e.g., via a handle) with a window (HWnd) 306 or similar unit in which graphic data is output for the program code. The VisualManager 304 manages the drawing of the top-level visual (and any children of that visual) to that window 306. To draw, the visual manager 304 processes (e.g., traverses or transmits) the scene graph as scheduled by a dispatcher 308, and provides graphics instructions and other data to the low level component 218 (FIG. 3) for its corresponding window 306. The scene graph processing will ordinarily be scheduled by the dispatcher 308 at a rate that is relatively slower than the refresh rate of the lower-level component 218 and/or graphics subsystem 222. FIG. 4 shows a number of child visuals 310-315 arranged hierarchically below the top-level (root) visual 302, some of which are represented as having been populated via drawing contexts 316, 317 (shown as dashed boxes to represent their temporary nature) with associated instruction lists 318 and 319, respectively, e.g., containing drawing primitives and other visuals. The visuals may also contain other property information, as shown in the following example visual class:

```
public abstract class Visual : VisualComponent
{
    public Transform Transform { get; set; }
    public float Opacity { get; set; }
    public BlendMode BlendMode { get; set; }
    public Geometry Clip { get; set; }
    public bool Show { get; set; }
    public HitTestResult HitTest(Point point);
    public bool IsDescendant(Visual visual);
    public static Point TransformToDescendant(
        Visual reference,
        Visual descendant,
        Point point);
    public static Point TransformFromDescendant(
        Visual reference,
        Visual descendant,
        Point point);
    public Rect CalculateBounds( ); // Loose bounds
    public Rect CalculateTightBounds( ); //
    public bool HitTestable { get; set; }
    public bool HitTestIgnoreChildren { get; set; }
    public bool HitTestFinal { get; set; }
}
```

As can be seen, visuals offer services by providing transform, clip, opacity and possibly other properties that can be set, and/or read via a get method. In addition, the visual has flags controlling how it participates in hit testing. A Show property is used to show/hide the visual, e.g., when false the visual is invisible, otherwise the visual is visible.

A transformation, set by the transform property, defines the coordinate system for the sub-graph of a visual. The coordinate system before the transformation is called pre-transform coordinate system, the one after the transform is called post-transform coordinate system, that is, a visual with a transformation is equivalent to a visual with a transformation node as a parent. A more complete description of the visual tree and the compositing system is included in the related patent application entitled INTEGRATION OF THREE DIMENSIONAL SCENE HIERARCHY INTO TWO DIMENSIONAL COMPOSITING SYSTEM cross-referenced above.

Translation of User Input for 3D Scene

Figure 6:
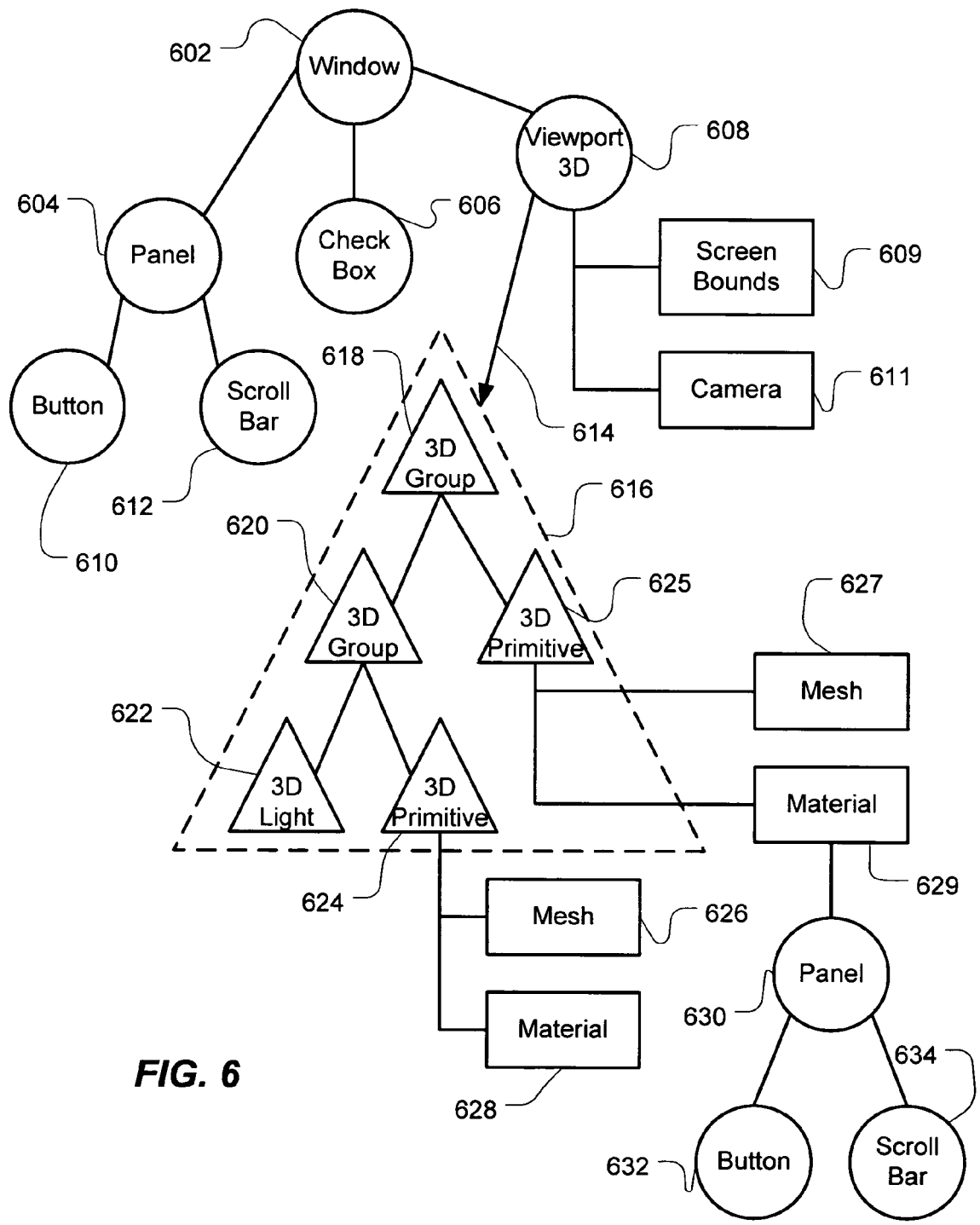
FIG. 6 illustrates an exemplary visual tree hierarchy of visual 2D objects and model 3D objects that is traversed by the operations in FIG. 7 and FIG. 8 to translate user input.

With the above hardware and software environment in mind, FIG. 6 illustrates a visual tree that produces a window on a computer display screen when processed by the compositing system described above. The visual 2D root object 602 for the window has three children, panel visual object 604, checkbox visual object 606, and viewport 3D object 608. The panel visual object 604 is a container visual object and has two children, a button visual object 610 and a scrollbar visual object 612. Thus the visual tree defines a window with a button, a scroll bar and checkbox along with a 3D scene viewed as a 2D camera image.

The viewport 3D control object 608 contains screen bounds 609 and camera parameters 611. The screen bounds includes the 2D boundaries of the of the 3D scene. The 2D boundaries in X, Y coordinates of the display area might be 0, 0, 500, 500 to define a viewport 500 units square. A reference or pointer 614 in the viewport 3D object 608 points to the 3D scene, and more particularly to the root object in the 3D scene. In FIG. 6, pointer 614 points to 3D group object 618 in the 3D scene 616. The 3D scene is made up of two 3D group objects, two 3D primitive draw objects and a light object. Each of the 3D primitive draw objects 624 and 625 contains drawing instructions including the 3D geometry for a model. The light object 622 specifies the illumination of the drawn model created by primitive objects 624. Primitive object 624 also contains mesh information 626 and material information 628, and primitive 625 contains mesh information 627 and material information 629. The material information 629 in this example is a further visual tree that has panel visual 2D object 630, and two children visual 2D objects, button object 632 and scroll bar object 634. In other words, some 2D control images are embedded in the 3D scene.

Figure 7:
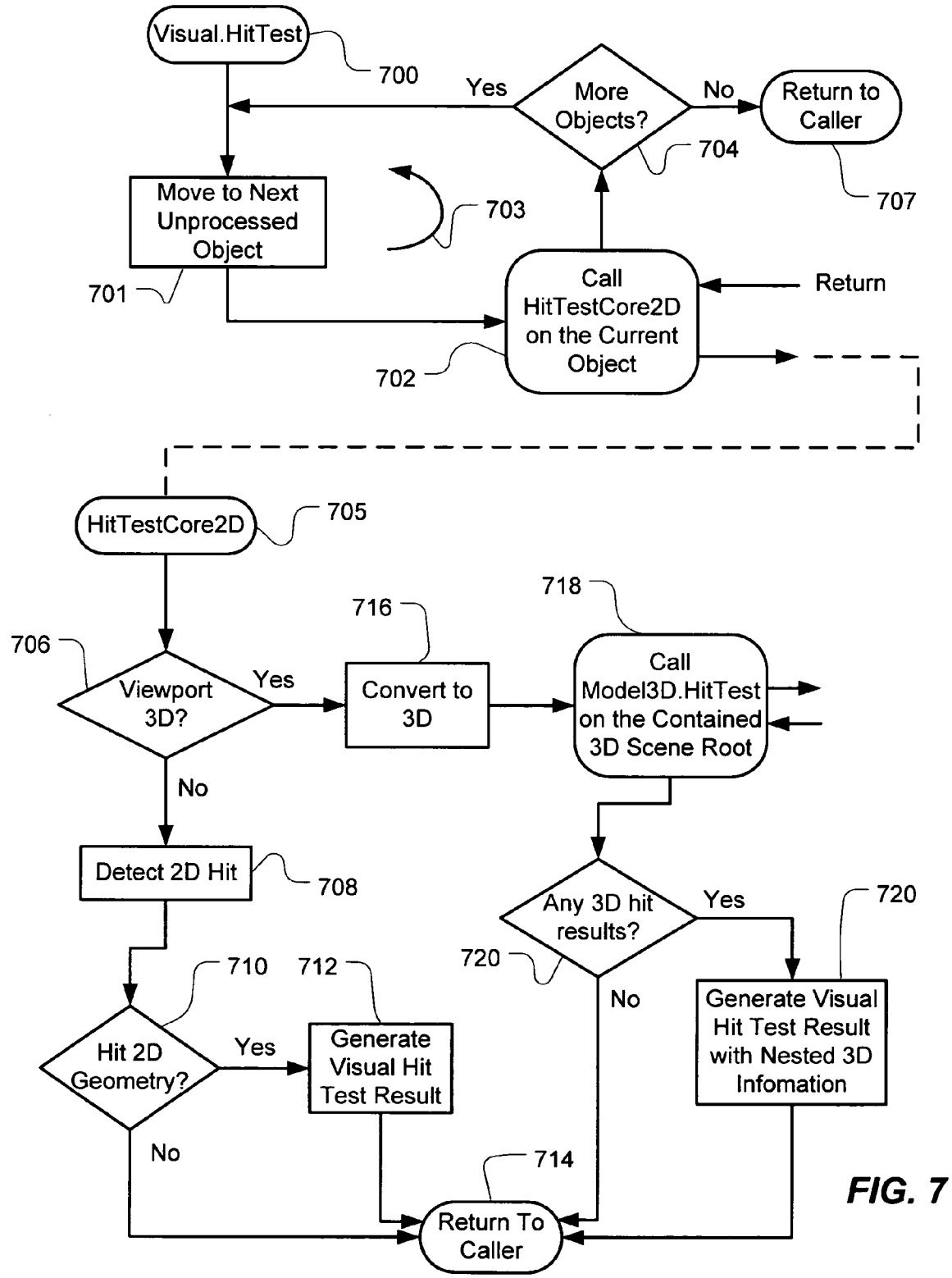
FIG. 7 shows an operation flow for perform a hit test on visual 2D objects in a visual tree hierarchy of visual 2D and 3D objects.
Figure 8:
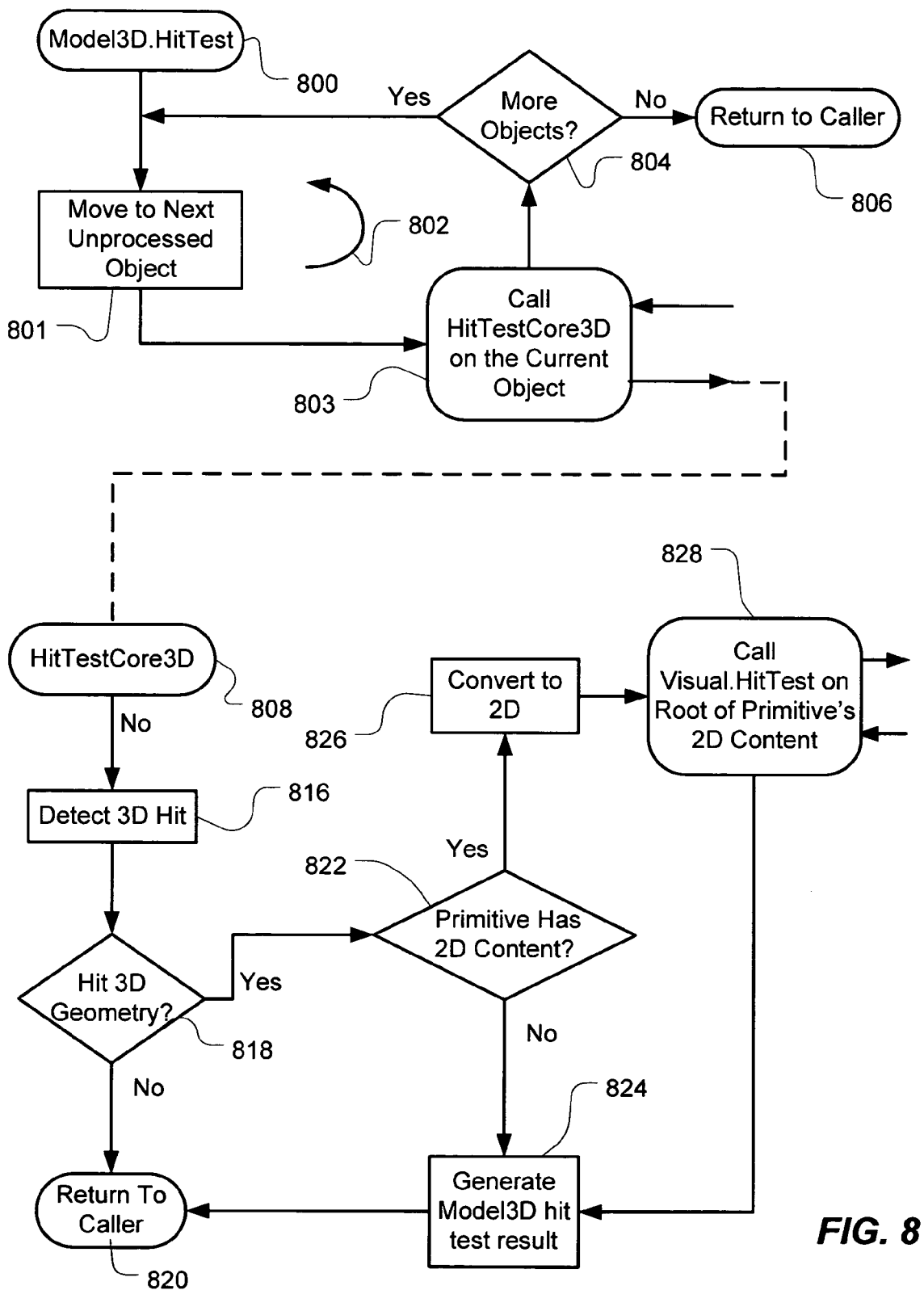
FIG. 8 shows an operation flow for perform a 3D hit test on model 3D objects in a visual tree hierarchy of visual 2D and model 3D objects.

The input translation operations for a visual tree begins when a primary caller in another higher level program calls either Visual.HitTest entry 700 in the 2D process operations of FIG. 7 or Model3D.HitTest entry 800 in the 3D process operations of FIG. 8. The transition between the two operational flows of FIGS. 7 and 8 for processing visual 2D objects and 3D model objects is seamless to the user.

For the visual tree example in FIG. 6, the operation flow called is the 2D process of FIG. 7. That call is from the primary caller for detecting a hit in the window image rendered by the visual tree in FIG. 6. The operation flow for 2D hit testing the window enters at 2D Visual.HitTest entry 700. Move operation 701 moves the processing to the next object in the tree which has not been processed. The first such object is window object 602. The operation flow enters loop 703 which contains call operation 702 and more objects test operation 704. As objects are processed for a 2D hit, the operation flow around the loop 703 walks the process through the tree.

Call operation 702 calls Hit Test Core 2D module entry point 705. At entry point 705 the operation flow passes to viewport 3D test operation 706. Test operation 706 detects whether the object is a viewport 3D object or a visual 2D object. In this case windows object 602 is a visual 2D object, and the operation flow branches "NO" to detect 2D hit operation 708. The 2D hit detect operation 708 compares the cursor point location to the 2D geometry of window object 602. If the cursor point is within the 2D geometry, i.e. the area covered by the window frame, there is a hit on the window. Hit 2D geometry test operation 710 tests whether a hit was detected. If there was a hit, the operation flow branches YES to generate 2D hit result operation 712. The 2D hit result is the cursor point location and the visual identifier of the visual 2d object whose image was hit. The operation flow then passes to return-to-caller operation 714. If no hit was detected, the operation flow branches NO from test operation 710 to return-to-caller operation 714. The return operation 714 returns the operational flow to the caller which in this case in call operation 702.

At call operation 702 the flow is directed to more objects test operation 704. More objects test operation 704 detects whether there are more objects to be hit tested in the tree. If there are, the operation flow branches YES to move operation 701. Move operation 701 moves down the left most branch of the tree to panel object 604 in FIG. 6 which is the next unprocessed object. The branches of the tree will be processed from left to right.

Panel object 604 is another visual 2D object and is processed in the same manner as just discussed for window object 602. Return operation again returns the flow to call operation 702 and the flow passes to move operation 701. Processing now moves to the first child of panel object 604 which is button visual 2D object 610. Button object is processed for a 2D hit as described above and the flow returns to call operation 702 and hence to move operation 701. The next unprocessed object in the same branch is the scroll bar visual object 612. This is a visual 2D object, and the operation flow will again pass to detect 2D hit operation 708 through viewport 3D test operaion 706. Detect 2D hit operation 708 will process the scroll bar visual object 612 in the same manner as described above for the processing of the window object 602. If a hit is detected, generate operation 712 will generate a 2D hit result, and the operation flow passes to return-to-caller operation 714. Likewise if a hit is not detected, the operation flow passes to return-to-caller operation 714. The operation flow again returns to the call operation 702, and move operation 701 walks the visual tree in FIG. 6 to the first object in the next branch, i.e. check box object 606.

After the checkbox object 606, which is 2D, is processed, move operation 701 walks the tree to viewport 3D object 608. The viewport 3D object 608 will be detected by viewport 3D test operation 706, and the operation flow will branch YES to 3D convert operation. Convert operation 716 creates a pick ray from the camera eye point and the cursor point in the same manner as described above in FIG. 1. Call operation 718 now calls the 3D process by calling Model3D.HitTest. The 3D process operational flow is illustrated in FIG. 8, and call operation 718 passes the operation flow to 3D process entry point 800.

In FIG. 8, the operation flow for 3D hit testing the 3D scene enters at Model3D.HitTest entry 800. Move operation 801 moves the processing to the next object in the tree which has not been processed. The first such object is 3D group object 618 which is also the root node of the 3D scene tree. The operation flow enters loop 802 which contains call operation 803 and more objects test operation 804. As objects are processed for a 3D hit, the operation flow around the loop 802 walks the process through the branches of the 3D scene tree from left to right.

Call operation 803 calls Hit Test Core 3D module entry point 808. At entry point 808 the operation flow passes to detect 3D hit operation 808. Detect 3D hit operation compares the path of the pick ray 15 (FIG. 1) to the 3D geometry of the model drawn by the object being tested. The first object is 3D group object 618. Since 3D group objects have no 3D geometry, no hit will be detected. Of course 3D group objects could be redefined to also draw models and have 3D geometry. In the preferred embodiment, the primitive 3D objects have 3D geometry, and a hit may be detected. If the ray intersects the model drawn by the 3D object, a hit has occurred. Hit 3D geometry test operation 818 tests whether a hit occurred. If a hit did occur, the operation flow passes to 2D content test operation 822. If a hit did not occur, the operation flow passes to return-to-caller operation 820. The return operation 820 returns the operational flow to the caller which in this case is call operation 803.

A return to call operation 803 causes the flow to pass around loop 802 to more objects test operation 804. More objects test operation 804 detects whether there are more objects to be hit tested in the 3D scene tree. If there are, the operation flow branches YES to move operation 801. Move operation 801 moves down the left most branch of the tree to 3D group object 620 in FIG. 6 which is the next unprocessed object. The branches of the tree will be processed from left to right.

Model 3D object 620 is another group object and will not have 3D geometry. Accordingly, detect 3D hit operation 816 will not detect a hit. Return operation 820 again returns the flow to call operation 803 and the flow passes to move operation 801. Processing now moves to the model 3D light object 622 which is the next unprocessed object in the same branch of the 3D scene tree 616. Light object 622 is processed for a 3D hit as described above, but light objects do not have 3D geometry. Therefore detect 3D hit operation will not detect a hit, and the flow returns to call operation 803 and hence to move operation 801. The next unprocessed object in the same branch is the 3D primitive object 624. Primitive objects do have 3D geometry as they draw the 3D models. Detect 3D hit operation 816 compares the path of the pick ray 15 (FIG. 1) to the 3D geometry of the model drawn by primitive 624. If the ray intersects the model, a hit has occurred. Hit 3D geometry test operation 818 tests whether a hit occurred. If a hit did not occur the operation flow passes to return-to-caller operation 820. If a hit did occur, the operation flow passes to 2D content test operation 822.

Since the primitive object 624 in FIG. 6 has no visual 2D objects attached, the operation flow would branch NO from 2D content test operation 822 to generate Model3D hit result 824. The 3D hit result includes the identification of the model hit, the hit path or pick path—nodes in the 3D scene tree traversed to reach object that was hit—, mesh intersected, intersection coordinates, and distance along pick ray. From the generate result operation 824 the operation flow passes to return-to-caller operation 820. At return-to-caller operation 820, the operation flow returns to the call operation 803. More objects test operation 804 detects that there are more objects in the 3D scene tree to be processed. Move operation 801 walks the 3D scene tree to the next branch and to 3D primitive object 625, the next unprocessed object.

The 3D primitive 625 object does have material information 629 that includes visual 2D objects. Accordingly, the operation flow branches YES from 2D content test operation 822 to convert to 2D operation 826. The convert to 2D operation converts from the pick ray back to the cursor point location. Then call Visual.HitTest operation 828 calls 2D process operations in FIG. 7, and the operation flow enters FIG. 7 at entry point 700. The 2D process of FIG. 7 will now process a second 2D visual tree consisting of visual 2D objects 630, 632 and 634. The loop 703 walks this second 2D visual tree through visual 2D object 630 to visual 2D objects 632 and 634. Each of these objects is checked for a 2D hit by operations 708 and 712. Detect operation 708 detects a hit if the cursor point is within the 2D geometry of the panel visual 2D object 630. If there is a hit, generate operation 712 generates the 2D hit result; if there was no hit, the operation flow passes to return-to-caller operation 714. Now the caller is call operation 702. The next unprocessed object is button object 632, and the hit test core 2D process is called again by call operation 702.

The button object is not a viewport 3D object so detect 2D hit operation 708 checks for a hit by the cursor point on the button 2D geometry of button visual object 632. The hit test operation 710 detects whether a hit occurred. If there was a hit, generate operation 712 generates the 2D hit result; if there was no hit, the operation flow passes to return-to-caller operation 714 and back to call operation 702. Move operation 701 then moves the test process to scroll bar visual 2D object 634 which is processed in the same way as panel object 630 and button object 632. Return operation 714 then returns the flow to call operation 703 and hence to more objects test operation 704. More objects test operation 704 detects there are no more objects in this second visual 2D tree and so branches the flow NO to return-to-caller operation 707. The caller in this case is call operation 828 in the 3D process shown in FIG. 8.

When call operation 828 detects the return of the process control, it passes the operation flow to generate operation 824 to generate model 3D hit result for the primitive 625. The operation flow then passes to return-to-caller operation 820. From the return operation 820, the operation flow is returned to call operation 718 in FIG. 7. Call operation 718 now passes the operation flow to any 3D results test operation 720. If there have been no 3D hit results from models in the 3D scene 616, the operation flow proceeds to return-to-caller operation 714. If there are 3D hit results, generate visual hit test result generates one or more 3D hits results into a 2D hit results. This is accomplished by attaching the 3D hit results to a cursor point location and visual identifier. Thus the normal 2D hit result has attached to it nested 3D hit information from the 3D hit result information generated by generate operation 824 in FIG. 8. The operation flow then proceeds to return-to-caller operation 714.

Return operation 714 now returns program control to call operation 702 and hence to more objects test operation 704. Since there are no more objects to be processed in the visual tree of FIG. 6, the operation flow branches NO to return to caller operation 707. In this case the caller is the primary caller (not shown) that called to the visual hit test process at entry point 700 translate input, i.e. hit detection, on the visual tree in FIG. 6. The operations called by the primary caller are now completed, and program control will be returned to the higher level program containing the primary caller.

Model 3D Hit Test API's

The following API's are defined for Model 3D Hit Test.

Model3D

The following additions to public abstract class Model3D allow the model to describe how it relates to hit testing as well as support initiation of the hit test.

```
public abstract class Model3D : ...
{
    ... existing abstract class Model 3D definitions ...
    // Support for hit testing against alternate model3d
    public HitTestModel HitTestModel
    { get; set; } // default = Box
    public Model3D AlternateModelForHitTest
    { get; set; } // default = Model3D.Empty
    // Enumerating yields general HitTestResult3D objects.
    public IEnumerable<HitTestResult3D>
    HitTest(HitTestParamaters3D params);
    // Enumerating yields HitTestResult3D objects.
    All other overloads
    // forward to this more general version.
    public IEnumerable<HitTestResult3D>
    HitTest(HitTestParamaters3D params,
        HitTestFilter filter);
}
```

HitTestModel

HitTestModel is used to control the 3D geometry used to test the intersection of the pick ray and the model. Values are:

| Value | Description |
| --- | --- |
| ActualModel | Tests against the actual geometry of this Model. |
| AlternateModel | Tests against the alternate geometry specified by the AlternateModel property. This allows the user to do things like specify a convex hull to reduce the complexity of hit testing. |
| BoundingBox | Tests against the bounding box surrounding the model. Exposes the internal bounding box probing we do as a means to do fast, approximate hit tests. |

HitTest( )

The Model3D.HitTest( ) method kicks off the whole process. It makes a (conceptually) complete pass at the tree (though not necessarily in the actual implementation), and returns an enumerator that will yield the HitTestResult3Ds when traversed.

The HitTest method optionally takes a HitTestFilter delegate. This is the same filter delegate used in 2D. The HitTestFilter delegate is called back with each Model3D as the scene graph is walked. Unlike 2D where the tree order is consistent with Z-order 3D must (conceptually) walk the entire tree because the first hit we encounter is not necessarily the closest.

HitTestParameters3D

The HitTest( ) methods on Model3D take a HitTestParameters3D object which defines the geometry and options to be used for the hit test. This an abstract base class with the concrete RayHitTestParameter and ConeHitTestParameter implementations.

```
public abstract class HitTestParameters3D
{
    // If true, the enumerator returned from HitTest( )
    should yield results sorted by
    // increasing distance from the origin of the hit test cone.
    Otherwise the order
    // is arbitrary. Default is true.
    public bool OrderResults { get; set; }
}
```

The flags sent into HitTest are shown above in the definition of HitTestFlags, and are interpreted as follows. Note that they each default to false.

RayHitTestParameters

A concrete implementation of HitTestParameters3D which defines the hit test geometry as a ray. Note the lack of "3D" suffix. The use of a ray implies a 3D domain for hit testing.

```
public class RayHitTestParameters : HitTestParameters3D
{
    public RayHitTestParameters(Point3D origin, Vector3D direction);
    public Point3D Origin { get; }
    public Vector3D Direction { get; }
}
```

ConeHitTestParameters

A concrete implementation of HitTestParameters3D which defines the hit test geometry as a cone. Note the lack of "3D" suffix. The use of a cone implies a 3D domain for hit testing.

```
public class ConeHitTestParameters : HitTestParameters3D
{
    public ConeHitTestParameters(Point3D origin,
        Vector3D direction, double
            spreadAngle);
    public Point3D Origin { get; }
    public Vector3D Direction { get; }
    public double SpreadAngle { get; }
}
```

HitTestResult3D

HitTestResult3D represents a single hit Model3D resulting from a Model3D.HitTest( ) invocation.

It is retrieved by access through the IEnumerable returned from Model3D.HitTest( ).

HitTestResult3D is an abstract class with concrete implementations for Ray and Cone intersection.

```
public abstract class System.windows.Media.Media3D.HitTestResult3D
{
    private HitTestResult3D( ); // no public construction
    public Model3D ModelHit { get; } // the Model3D that was hit
    public IEnumerable<Model3D> HitPath { get; }
    // list of Model3D's on the way down
}
```

ModelHit

This property is filled with the 3D model that was hit. This is any Model3D in the hierarchy that was hit. Thus, if we have:

Model3DGroup
    Model3DGroup
      MeshPrimitive3D

And the MeshPrimitive3D is hit then there will be a separate HitTestResult3D for each of these three Model3D's. However, only the last one, the HitTestResult3D from the MeshPrimitive3D, will contain intersection information.

(NOTE: This behavior can be overridden with the filter delegate)

HitPath

HitPath is a lazily evaluated IEnumerable that enumerates from the model hit backwards up the graph to the root. This is an important source of information to disambiguate multiple paths to the same Model3D, since they can be multi-parented.

The "bottom up" ordering was chosen because it is assumed that the common case for using this property will be to check your parent to disambiguate your self in a multiple use scenarios.

The decision to include the ModelHit in the HitPath was made for consistency with other 3D frameworks where the result of a hit test is a pick path and there necessarily includes the model hit. From this perspective, ModelHit is just syntactic sugar for the first item in your pick path.

RayHitTestResult

A concrete implementation of HitTestResult3D which adds details of the intersection of a Model3D with a Ray. Note the lack of "3D" suffix. The use of a ray implies a 3D domain for hit testing.

```
public class RayHitTestResult : HitTestResult3D
{
    // No public construction
    internal RayHitTestResult( )
    // Enumerating yields RayIntersection objects for each
    // intersection between the model and the ray (there can be
```

```
        // multiple intersections per model.)
        //
        public IEnumerable<RayIntersection> Intersections { get; }
        // Returns the closest intersection
        public RayIntersection ClosestIntersection { get; }
    }
```

ConeHitTestResult

A concrete implementation of HitTestResult3D which adds details of the intersection of a Model3D with a Ray. Note the lack of "3D" suffix. The use of a ray implies a 3D domain for hit testing.

```
public class ConeHitTestResult : HitTestResult3D
{
    // No public construction
    internal RayHitTestResult( )
    // Enumerating yields ConeIntersection objects for each
    // intersection between the model and the cone (there can be
    // multiple intersections per model.)
    //
    public IEnumerable<RayIntersectionDetails> Intersections { get; }
    // Returns the closest intersection
    public RayIntersectionDetails ClosestIntersection { get; }
}
```

RayIntersection

RayIntersection is an abstract class that has concrete subclasses for each type of Model3D that is able to provide detailed information about its intersection with a ray. The RayHitTestResult.Intersections property returns an IEnumerable that, when iterated over, yields RayIntersections.

It's up to the receiving application to take these RayIntersections and cast them, based on type, to their proper concrete subclass in order to access the content of the specific subclasses.

```
public abstract class System.Windows.Media.Media3D.RayIntersection
{
    // point of intersection to cone tip (for this face)
    public abstract double DistanceToRayOrigin { get; }
    // the point in model space of the intersection
    public abstract Point3D PointHit { get; }
}
```

DistanceToRayOrigin—the distance to the origin of the hit-testing ray from the mesh's point of intersection.
PointHit—The point in the hit model's coordinate system where the ray intersected this face.
RayMesh3DIntersectionDetails
RayMesh3DIntersection is a concrete extension of RayIntersection which adds details about the intersection between the ray and the Mesh3D.

```
public class RayMesh3DIntersection : RayIntersection
{
    private RayMesh3DIntersection( ); // no public construction
    public Mesh3D MeshHit { get; }
    // Information for hit location interpolation.
    public int        VertexIndex1 { get; }
    public int        VertexIndex2 { get; }
    public int        VertexIndex3 { get; }
    public double VertexWeight1 { get; }
    public double VertexWeight2 { get; }
    public double VertexWeight3 { get; }
}
```

MeshHit—the Mesh3D that was hit.
The final parameters provide the information necessary for an application to blend and interpolate vertex information properly based on where on the triangle the hit occurred.
VertexIndex1,2,3—indices into the position, normal, texture coordinate, etc., collections of the vertices that make up the face that is intersected.
VertexWeight1,2,3—these are the Barycentric coordinates of the point on the face that was actually hit. These coordinates indicate the contribution of the individual vertices.

Figure 9:
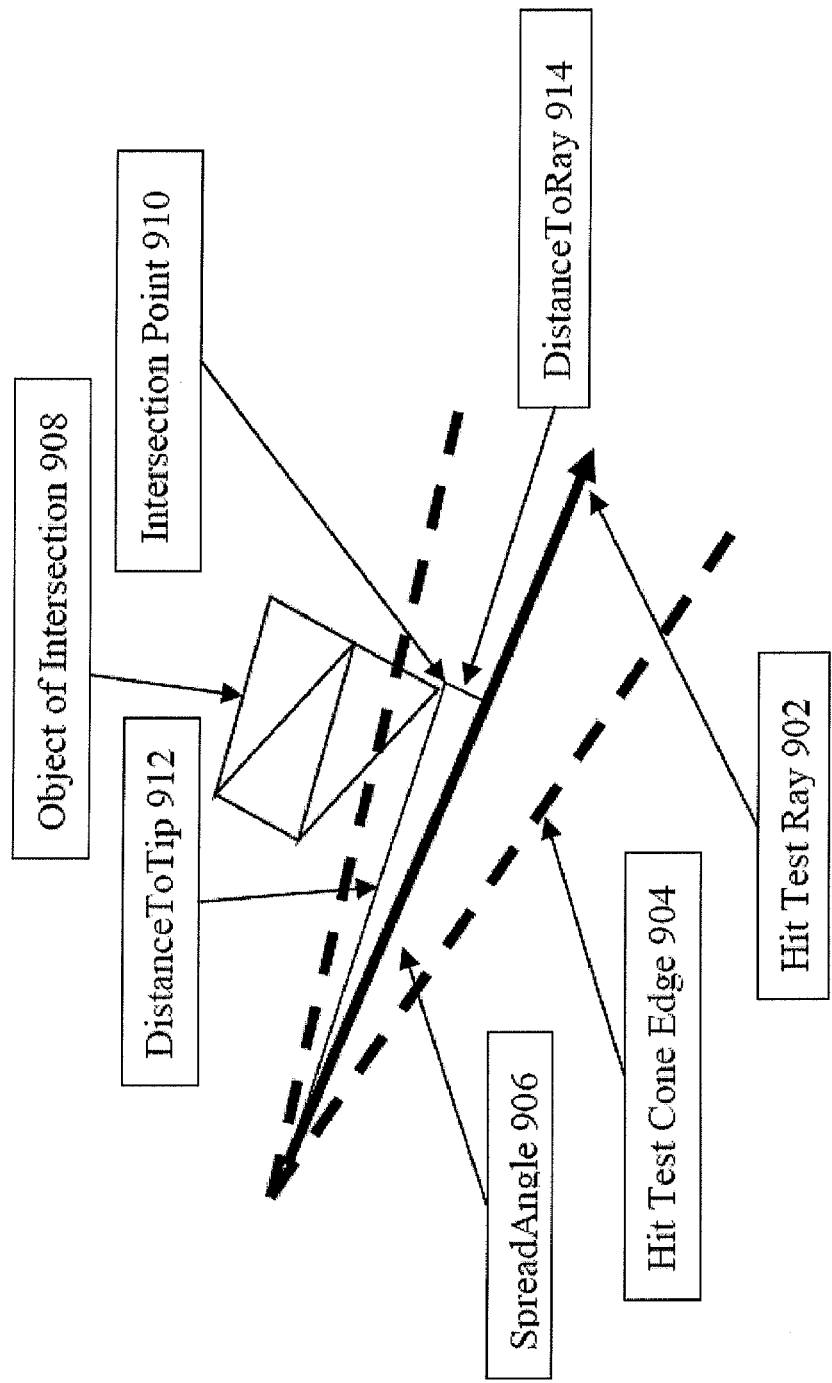
FIG. 9 is a diagram illustrating cone intersection details of a hit test.

ConeIntersectionDetails
TBD. The below is a snippet form the original spec which included heuristics from coercing a cone intersection into a hit point:

FIG. 9 is a diagram illustrating cone intersection details of a hit test. The hit test ray 902 is in solid thick black, and the edges of the hit test cone 904 are in dashed thick black. The SpreadAngle 906 is the angle between the hit test ray 902 and the edge of the hit test cone 904. The object of intersection 908 is the set of three triangles (imagine them facing into the page). The ray doesn't directly intersect it, but the point on the cone that does, i.e., Intersection Point 910, allows calculation of both DistanceToTip 912 and DistanceToRay 914.

An application may choose to use DistanceToRay 914 to prefer a hit that might be directly on the ray, albeit it farther away, than one slightly off the ray.

Note that DistanceToTip 912 is always the distance to the point on the hit geometry closest to the ray. This is required for continuity, otherwise the distance could "jump" when the geometry passes through the ray. If a given primitive is hit more than once (say it has an S-like topology and the ray comes in from the top), then multiple Intersectioninfo's are returned.

Details for Other Model3D's

Specification for Framework/Viewport3D Level

```
public class Viewport3D : FrameworkElement
{
    ...
    public double HitTestSpreadAngle { get; set; }
    // default to 5 degrees.
    public static readonly DependencyProperty
    HitTestSpreadAngleProperty;
    ...
}
```

At the Viewport3D level, the only additional API required is for determining hit test cone spread angle, since Viewport3D gains all of the hit testing entry points from Visual/FrameworkElement (such as HitTestCore and HitTestBounds). The basic implementation of it is straightforward:
When a 2D hit request to a particular point comes in, we need to calculate the cone parameters with which to conduct the hit test in 3D.
The cone will have its tip in the plane defined to be perpendicular to the viewing direction of the camera that's defined on the Viewport3D. The cone's ray will be pointing in the same direction as the camera.

The delegates and hit test parameters that come into Viewport3D will be passed onto Model3D.HitTest( ) so they can come back out again on the other side when 2D is re-entered.

The caller of Model3D.HitTest( ) (that is, the Viewport3D implementation) then enumerates through its results, and figures out the right responses to HitTestCore/HitTestBounds, etc, and returns the right thing out.

Note that Viewport3D always sets its Model's IncludeInHitTestResult3Ds to true, so it will at least receive confirmation that the Viewport3D's model as a whole was hit or not hit. IHitTestResult3DContainer When the user initiates a 2D HitTest on Viewport3D the result can be cast to a IHitTestResult3DContainer which is defined as follows:

```
public class IHitTestResult3DContainer
{
    public IEnumerable<HitTestResult3D> Results { get; }
}
```

This is the means by which the programmer can extract the 3D intersection information from a hit test initiated from 2D. In practice, this would look as follows:

```
PointHitTestResult result2D = visual.HitTest(p);
// Check to see if we hit an 3D geometry
IHitTestResult3DContainer ht3dResults = result2D as
IHitTestResult3DContainer
if (ht3dResults != null)
{
    // We did hit 3D geometry, enumerate the 3D results
    foreach(HitTestResult3D result3D in hr3dResults.Results)
    {
        ...
    }
}
```

HitTesting into VisualMaterial

Hit testing continues into a VisualMaterial mapped onto 3D. As described above, the proper delegates and 2D parameters are being sent down into the 3D hit test. When a VisualMaterial is encountered, the 2D walk can be resumed, but needs to occur at the right spot in the 2D coordinate system of the VisualMaterial. This is done by taking the IntersectionInfo from the 3D hit, calculating texture coordinates of that hit, and mapping that back to 2D coordinates from which to begin the next level of hit testing into 2D. The continuation of the hit testing will proceed without the knowledge of the clients that 3D was ever transitioned through.

Other Embodiments

A pick ray is defined by the camera location and cursor point location in FIG. 1. However, a pick ray might also be defined by data input. In other words the user could simply input data defining the pick ray. Particularly, if a user wished to start hit detection in the 3D scene tree, the user would input the pick ray data and call the 3D hit test method on a model 3D object. Further the camera in one preferred embodiment shown in FIG. 1 is a perspective camera. However an orthographic camera could be used. With such a camera, all rays are parallel so the only camera information required is the aim direction for the camera. The pick ray into the 3D scene would be from the cursor point location in the aim direction of the camera.

Also, the pick ray is a projection of a point—the cursor point projected in a direction based on the camera view point. Alternative embodiments for the perspective camera include a light beam in the shape of cone. In this case, the intersection between the cone and a 3D model is an area bounded by the model's intersection with the cone. A cone in effect is the projection of a circle rather than projection of a point. Other 2D shapes might be used in place of the circle to obtain other intersection effects. Also if the camera is orthographic with all rays parallel, than the light beam is an extrusion of that 2D shape into the 3D space of the 3D scene.

Note that a 3D scene can contain visual material which has a 2D scene which includes another viewport 3D object. This second viewport 3D object contains a second 3D scene. Thus, by using multiple viewport 3Ds and multiple visual materials, 2D and 3D content can be nested in each other any number of times.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer storage medium not consisting of a modulated data signal and having instructions stored thereon for performing a method of translating user input applied to computer program objects for creating three-dimensional (3D) images and two-dimensional (2D) images in a visual tree object hierarchy having visual 2D objects and model 3D objects, the method comprising:

providing an object tree hierarchy, the tree hierarchy having one or more visual 2D objects and one or more model 3D objects;

drawing a 2D image with a 2D geometry using the one or more visual 2D objects in the tree hierarchy;

drawing a 3D image with a 3D geometry using the one or more model 3D objects in the tree hierarchy; and processing the 2D image to generate 2D hit results by detecting a hit on the 2D geometry, wherein a hit is detected by determining that a cursor point location is within the 2D geometry of the 2D image;

converting a 2D input to a 3D scene made up of the one or more 3D models, wherein the converting comprises:

detecting a model 3D object;

generating 3D hit results by setting a ray penetrating into the 3D scene using one of a plurality of viewport 3D objects each containing camera data, the camera data defining a camera view point location in 3D space from which to view the 3D scene, wherein a hit is detected when the ray intersects the one or more model 3D objects at one or more intersection points;

converting the 3D hit results to 2D information by attaching the 3D hit results to a cursor point location; and generating a 2D hit result list, wherein the 2D hit result list includes 2D hit results and the 2D information corresponding to the 3D hit results.

2. The computer storage medium of claim 1 wherein the 2D input is a cursor point location in 2D space.

3. The computer storage medium of claim 2 wherein the camera view point location and the cursor point location define the direction of the ray penetrating into the 3D scene.

4. A computer-implemented method for processing a hierarchy of computer program visual objects for detecting a hit by 2D input on two dimensional (2D) and three-dimensional (3D) images displayed by a computing system, the method comprising:

traversing by a processing unit branches of a first tree hierarchy to reach 2D and 3D visual objects;

detecting whether a next unprocessed object is a visual 2D object with 2D geometry or a model 3D object with 3D geometry;

generating 2D hit results when the next unprocessed object is a visual 2D object with 2D geometry by calling a method to detect a hit on the 2D geometry of a visual object;

generating 3D hit results when the next unprocessed object is a model 3D object with 3D geometry by calling a method to detect a hit on the 3D geometry of a visual object, wherein the 3D process comprises:

setting a pick ray, wherein the path of the pick ray is determined by the 2D input location and a camera view point location; and detecting a hit when the pick ray passes through the 3D geometry of the model 3D object, wherein a hit is detected when the pick ray intersects the model 3D object at one or more intersection points;

converting the 3D hit results to 2D information by attaching the 3D hit results to a cursor point location; and generating a 2D hit result list, wherein the 2D hit result list includes 2D hit results and the 2D information corresponding to the 3D hit results.

5. The computer-implemented method of claim 4, wherein the 2D input is a point in 2D space identified by a user-controlled pointing device.

6. The computer-implemented method of claim 5, wherein the 2D input is a cursor point location.

7. The computer-implemented method of claim 4, wherein a tree hierarchy defining a model 3D object has at least one content visual 2D object defining 2D content for a 3D model of the model 3D object and the method further comprises:

detecting the content visual 2D object for the 3D model; and converting the input from a ray to a cursor point location.

8. The computer-implemented method of claim 4, further comprising:

comparing the ray to the 3D geometry of each model 3D object; and detecting a hit on the model 3D object by the a HitTestCore3D method when the ray intersects a 3D model drawn by the model 3D object.

9. A system for translating two-dimensional (2D) graphical input by a user selecting one or more 2D images in a three-dimensional (3D) scene of 3D models created by model 3D objects, said system comprising:

a processing unit;

a memory, communicatively coupled to the processing unit, storing computer executable instructions that when executed by the processing unit provide:

a viewport module defining 2D boundaries of the 3D scene and a view point location in 3D space for viewing the 3D scene;

a retrieve module retrieving a selection point location in 2D space for the 2D graphical input, wherein the 2D graphical input is a cursor point on a computer display screen;

a set module setting a pick ray in 3D space based on the view point location and the selection point location;

a 3D hit detection module detecting a hit by the pick ray on a 3D model in the 3D scene, wherein a hit is detected when the pick ray penetrates into the 3D model at an intersection point along the pick ray;

a 3D conversion module converting 3D hit results to 2D information by attaching the 3D hit results to a cursor point location; and a report module generating a 2D hit result list, wherein the 2D hit result list includes the 2D information corresponding to the 3D hit results.

10. The system of claim 9 further comprises:

a report module reporting the 3D hit results of the hit on the 3D model.

11. The system of claim 10 wherein the 3D hit results include the model hit, the intersection point, and the distance of the intersection point along the pick ray.

12. The system of claim 9 further comprises:

a 2D content detect module detecting 2D content in the image of a 3D model, the 2D content created by a content visual 2D object;

a 2D conversion module converting the pick ray to a cursor location; and a 2D hit detect module detecting a hit on the 2D content based on the cursor location and 2D geometry defined by the content visual 2D object.

13. The computer-implemented method of claim 4, wherein the virtual camera comprises at least one of:

a perspective camera, wherein camera rays include a light beam in the shape of a cone; and an orthographic camera, wherein camera rays are parallel, and wherein the camera view point is an aim direction of the orthographic camera.

14. The computer storage medium of claim 1, wherein the camera view point is not aligned with a display screen.

* * * * *